United States Patent
Arnold et al.

(10) Patent No.: US 6,289,452 B1
(45) Date of Patent: Sep. 11, 2001

(54) METHOD AND SYSTEM FOR DELIVERING DIGITAL PRODUCTS ELECTRONICALLY

(75) Inventors: Thomas Andrew Arnold, San Jose; John Philip Pettitt, Los Altos; Jesse Noel Rendleman, Jr., San Francisco; Robert Lincoln Lewis, Jr., San Jose, all of CA (US)

(73) Assignee: Cybersource Corporation, Mountain View, CA (US)

( * ) Notice: Subject to any disclaimer, the term of this patent is extended or adjusted under 35 U.S.C. 154(b) by 0 days.

(21) Appl. No.: 08/965,836

(22) Filed: Nov. 7, 1997

(51) Int. Cl.[7] .................................................. H04L 9/32
(52) U.S. Cl. ........................... 713/175; 713/167; 705/51; 705/59
(58) Field of Search .................................. 705/59, 52, 51, 705/53, 54, 76; 713/175, 167, 156

(56) References Cited

U.S. PATENT DOCUMENTS 5,138,712 * 8/1992 Corbin .................................. 713/200
5,708,709 * 1/1998 Rose ...................................... 705/59
5,864,620 * 1/1999 Pettitt .................................... 705/54
6,023,509 * 1/2000 Herbert et al. ........................ 705/76

* cited by examiner

Primary Examiner—Gilberto Barron, Jr.

(57) ABSTRACT

A system and method for delivering a digital product electronically is disclosed. The system and method comprises providing an electronic license certificate (ELC) from an enduser to a server and then validating the ELC by the server. Finally, the method and system includes sending the digital product from the server to the user based upon validation of the electronic license certificate by the server. Accordingly, a digital product delivery system that is based on the concept of an active license (AL) which contains a plurality of active license objects (ALPOs) is disclosed. An ALPO is a software program that contains a digitally signed certificate document that may entitle the holder to receive, possess, and use a specific product. In essence, this certificate is a software application program that contains three major components: an electronic license certificate (ELC), a certificate viewer, and application functions to perform operations as granted by the license certificate, for example, retrieving and installing digital products.

32 Claims, 7 Drawing Sheets

METHOD AND SYSTEM FOR DELIVERING DIGITAL PRODUCTS ELECTRONICALLY

FIELD OF THE INVENTION

The present invention relates generally to digital products, and more particularly to a method and system for delivering digital products in an on-line environment.

BACKGROUND OF THE INVENTION

Software today is developed by authors who represent both large software companies and independent programmers. Both types of authors, however, are faced with problems associated with marketing their software, and with limiting the use of the software to only authorized users.

In a direct-marketing system, an author markets software directly to the user via a computer network, such as the Internet for example. Typically, a large software company distributes demonstration copies of commercial software products and invites the user to test the software. If the user is satisfied, the user sends a payment to the company in return for the commercial version of the software. Independent programmers, in contrast, often distribute what is known as shareware, in which the user is allowed to test software that is typically a smaller, but fully functioning version of a commercial program. If the user is satisfied, the user is requested to pay the programmer a fraction of the cost of the commercial product in return for technical support and documentation.

Providing the user with demonstration software or providing the software without documentation prior to payment is an attempt by the author to restrict users who have not paid from using the software. To prevent unauthorized copying, the author could send the software to the users in encrypted form and require the user to send for a key in order to unlock the software. However, after the user has received the key and unlocked the software, the user may distribute the software to others, and the author has no way of knowing which users have been formally authorized.

A system which allows for the distribution of software which is on-line is described in copending patent application Ser. No. 08/638,949, now U.S. Pat. No. 5,864,620 entitled "A Method and System for Controlling Distribution of Software in a Multilevel Distribution Chain", and assigned to the assignee of the present invention.

The above-identified patent application is directed toward a method and system for controlling distribution of software to a user in a multitiered distribution chain. The system includes at least one entity that distributes the software in a locked software container. The distribution includes means for receiving a request from the user to use the software. The method and system further includes a license clearing house for controlling usage rights of the software. The license clearing house includes means for receiving the request from the at least one entity, means for validating the request, means for generating a unique authentication certificate if the request was validated, and means for sending a reply to the user. The reply includes the authentication certificate and a master key, where the master key unlocks the software container and enables the user to use the software, and the authentication certificate identifies the user as an authorized user of the software.

According to the system and method disclosed herein, the only trusted entity in the distribution chain is the license clearing house, all other entities including the author of the software are incapable of generating authorization certificates. Although this system works effectively for its intended purposes, it has some drawbacks that are in common with other conventional systems. To more clearly describe these drawbacks refer now to the following discussion.

Most typical systems are based on a vending machine business model where an enduser decides to purchase a product, completes the order and payment process, and then is authorized to download the product, which is secured by a encrypted wrapper. Along with the download, an electronic license certificate (ELC) that also contains an unlock key is delivered to the end-user via e-mail.

Such systems have some common characteristics which will be described below. First of all, all products must be packed in a secure container. Commonly, this is a wrapper technology that can be provided for example by Portland Software, Inc. Packed product (Bag of Bits or BOB) can be acquired from any source and is basically useless until opened by the key. As a result of a purchase the end-user receives a separate ELC and a reference to a location for downloading the BOB. BOBs must be downloaded completely prior to unpacking. The ELC carries references to the end-user license agreement from the product publisher that must be agreed to by the end-user prior to unpacking and installing the BOB. ELCs are digitally signed documents that function both as a delivery mechanism for unlock keys and a digital proof of purchase. The end-user activates the BOB unpack program and copies the ELC into the BOB. Assuming the ELC is valid, the packed BOB opens and installs the program.

The primary challenges associated with the current system include:

Usability. Intellectual property (IP) rights publishers desire to brand and manage the end-user's experience. This requires a unpack product that provides some form of scripting capabilities in which the IP rights publisher can adjust and alter the behavior of the unpack application.

2. End-user unpack and install experience. This may be viewed as a component of usability, but is more focused at adapting the actual end-user's experience unpacking and installing the product for a market that is primarily non-technical and not very adept with computer systems.

3. Failed BOB downloads: For whatever reason, the download of a BOB may fail. In the case of the vending machine business model, an end-user has already been charged for the product. This adds to the frustration of the end-user.

The aforementioned factors have a significant negative impact on the community of end-users and result in numerous customer calls to both merchants and IP publisher support centers. Left unresolved, these issues will adversely impact the profitability of selling digital products.

Accordingly, what is needed is an improved system and method for delivering digital products that is more effective than previously known systems. The present invention addresses such a need.

SUMMARY OF THE INVENTION

A system and method for delivering a digital product electronically is disclosed. The system and method comprises providing an electronic license certificate (ELC) from an enduser to a server and then validating the ELC by the server. Finally, the method and system includes sending the digital product from the server to the user based upon validation of the electronic license certificate by the server. Accordingly, a digital product delivery system that is based on the concept of an active license (AL) which contains one or more active license objects (ALPOs) is disclosed. An ALPO is a digital document that contains a digitally signed certificate document that may entitle the holder to receive, possess, and use a specific product. In essence, this certificate is a software application program that contains three major components: an electronic license certificate (ELC), a certificate viewer, and application functions to perform operations as granted by the license certificate, for example, retrieving and installing digital products on an end-user's system.

DESCRIPTION OF THE INVENTION

The present invention relates to an improvement in delivering software in a distribution network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
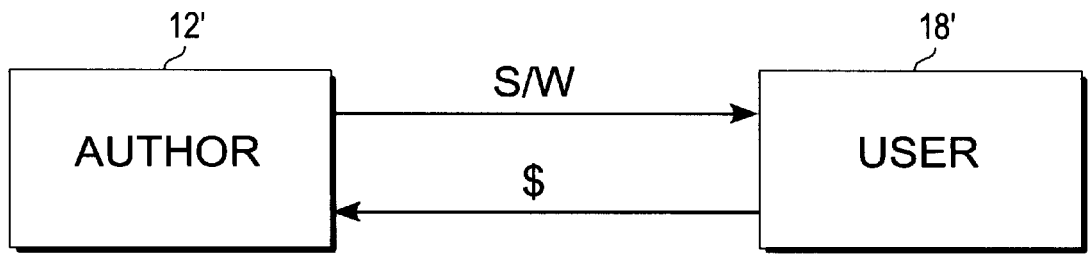
FIGS. 1A and 1B are block diagrams illustrating conventional software distribution methods.

FIG. 1A is block diagram illustrating a conventional direct-marketing system for distributing software in which an author 12' of a software program widely distributes the software directly to an end-user 18' via computer networks, for example. The author 12' may be a large software company who is distributing demonstration programs for the end-user 18' to try, or the author may be an independent programmer who is distributing shareware. As shown, if the end-user 18' is satisfied with the product, the end-user 18' sends some form of payment directly to the author 12'.

Figure 1B:
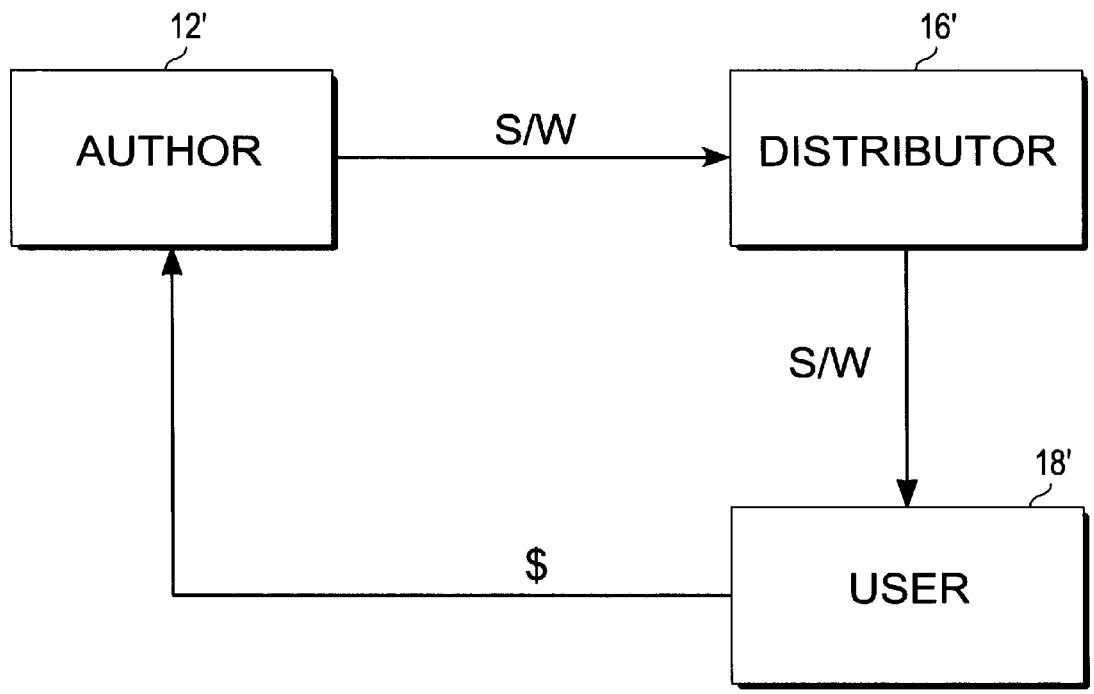

FIG. 1B is block diagram illustrating a conventional multitier software distribution chain in which an author 12' provides software to one or more distributors 16', who then sell the software to the end-user 18'. In this system, the end-user 18' pays the author 12', who in turn, pays a commission to the distributor 16', or the end-user 18' pays the distributor 16' for the software, and the distributor 16' then pays the author 12' a royalty.

In either case, neither the distributor 16' or the author 12' can ensure payment from the other party. Each party is forced to trust the other. In addition, the distributor 16' or the end-user 18' may provide unauthorized copies of the software to others. Even if the end-user 18' is required to obtain a key, once the software is unlocked, the author 12' has no mechanism to distinguish authorized users from unauthorized users.

Figure 2:
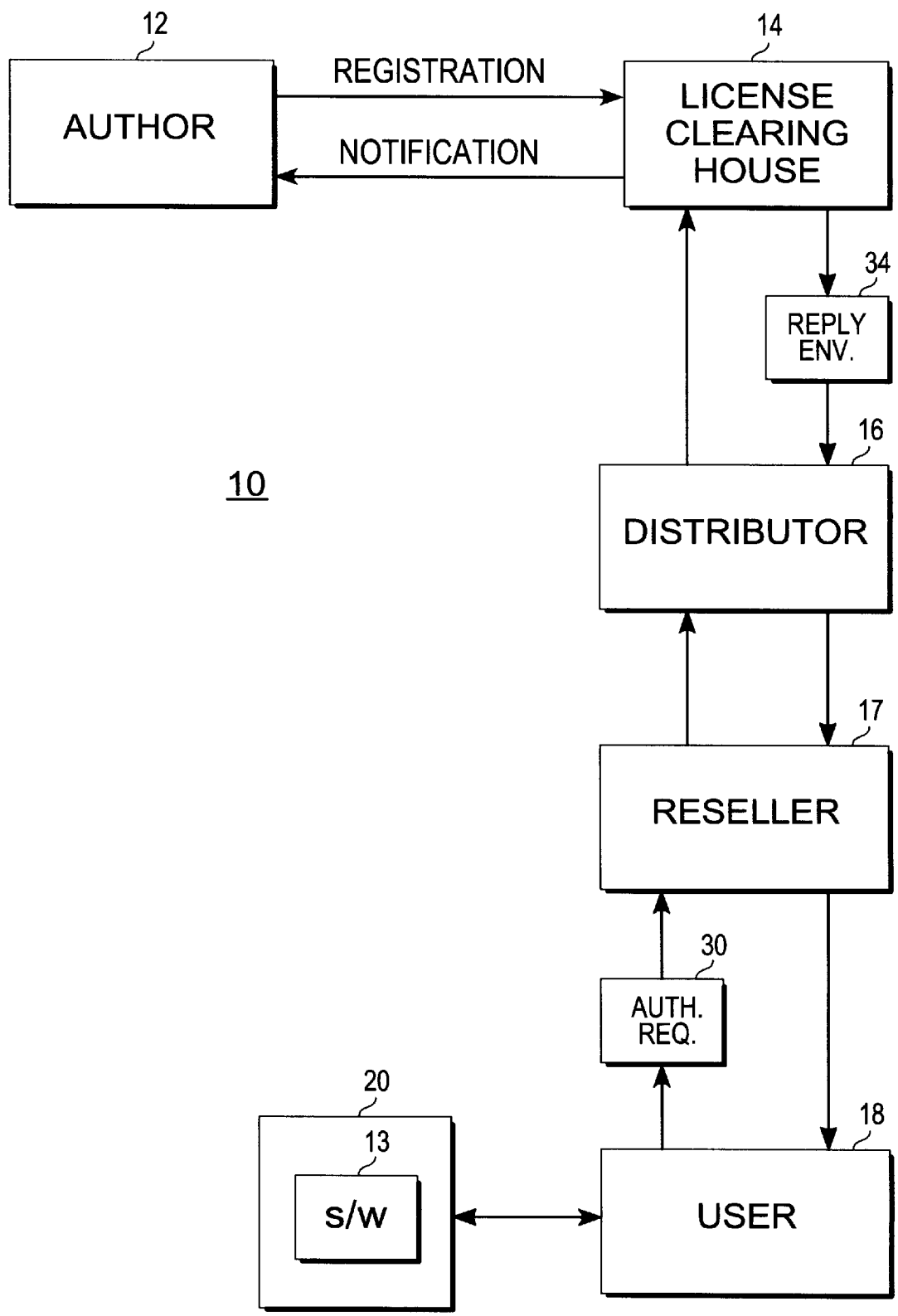
FIG. 2 is a block diagram of a multitier software distribution method and system.

FIG. 2 is a block diagram of the multitiered software distribution system 10 as above-described in U.S. patent application Ser. No. 08/638,949 that addresses some of the above-mentioned problems. The system 10 includes an author 12 who has developed software 13, and one or more distributors 16, one or more optional resellers 17, and an end-user 18. In accordance with the present invention, the multitiered software distribution system 10 also includes a license clearing house (LCH) 14, which ensures the integrity and controls the usage rights of the software 13.

Figure 3:
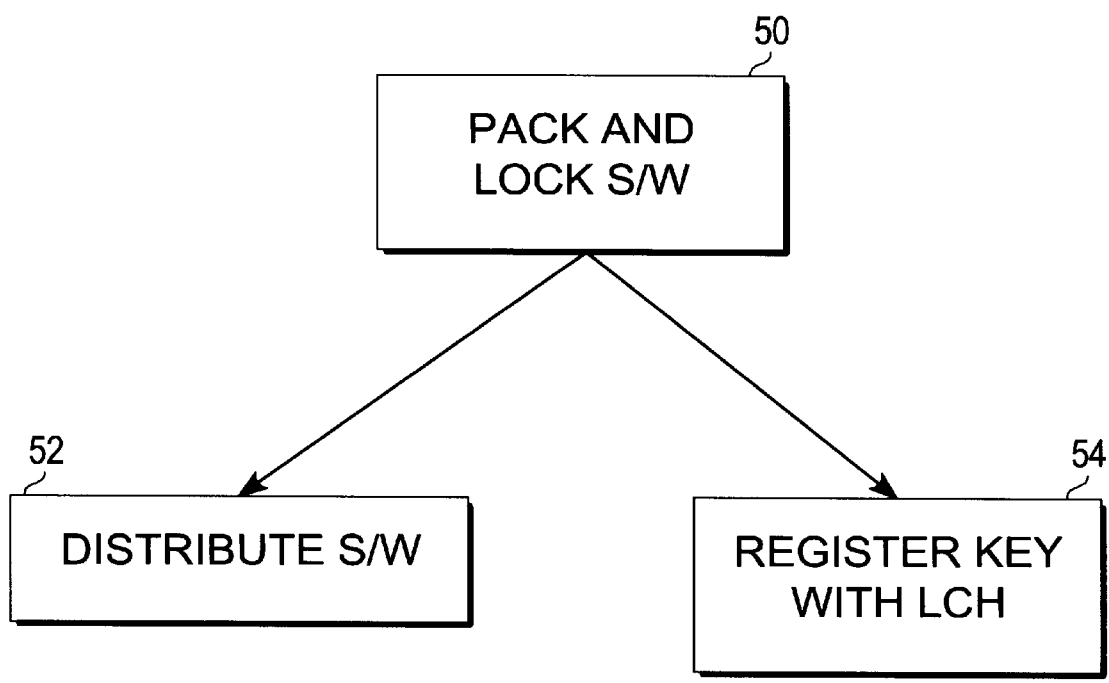
FIG. 3 is a flow chart illustrating the interaction between an author and the license clearing house.

Referring to FIG. 3, a flow chart of the interaction between the author 12 and the LCH 14 is shown. After the author 12 has developed software 13 that s/he wants to market, the author 12 packs the software 13 in a digital shipping container 20 shown in FIG. 2, and locks the container 20 through encryption in step 50. For purposes of this specification, the term digital shipping container 20 means an encrypted data object in which the software 13 is stored that can be opened only by a validated key. As will be appreciated by those with ordinary skill in the art, many types of encryption schemes may be used, such as DES, for example.

After the software 13 has been encrypted, the author 12 distributes the software 13 for public availability in step 52. In a preferred embodiment, copies of the encrypted software 13 are provided to the distributor 16, who then provides them to the reseller 17 for public sale. Copies of the encrypted software 13 may also be provided directly to the end-user via computer networks, such as the Internet, or via cable TV.

After the software 13 has been made publicly available, the author 12 registers the identity of each container 20 with the LCH 14 in step 54 by identifying the key or keys used to encrypt the containers 20. The author 12 also registers the identities of those distributor(s) 16 and reseller(s) 17 that the author 12 has chosen to distribute the software 13. The author 12 may either encrypt each copy of the distributed software 13 with a single master key and deposit the master key with the LCH 14, or the master key may be encrypted with a second key, and the second key deposited with the LCH 14.

The public encryption keys of the distributor 16 and reseller 17 are also registered with the LCH 14. To ensure authentication, the LCH 14 may obtain public key certificates for the distributor 16 and reseller 17 from an external authority (not shown). Once again, the above-described system has some advantages, however it has some drawbacks.

The present invention provides a system and method that fundamentally shifts the method by which digital products would be delivered by an enhanced electronic license certificate embedded in an active license product object (ALPO) which when coupled with an active license (AL) will fetch and download a digital product. In so doing, the problems associated with conventional digital product delivery systems are substantially minimized. The following describes the features of the present invention in more detail.

Figure 4:
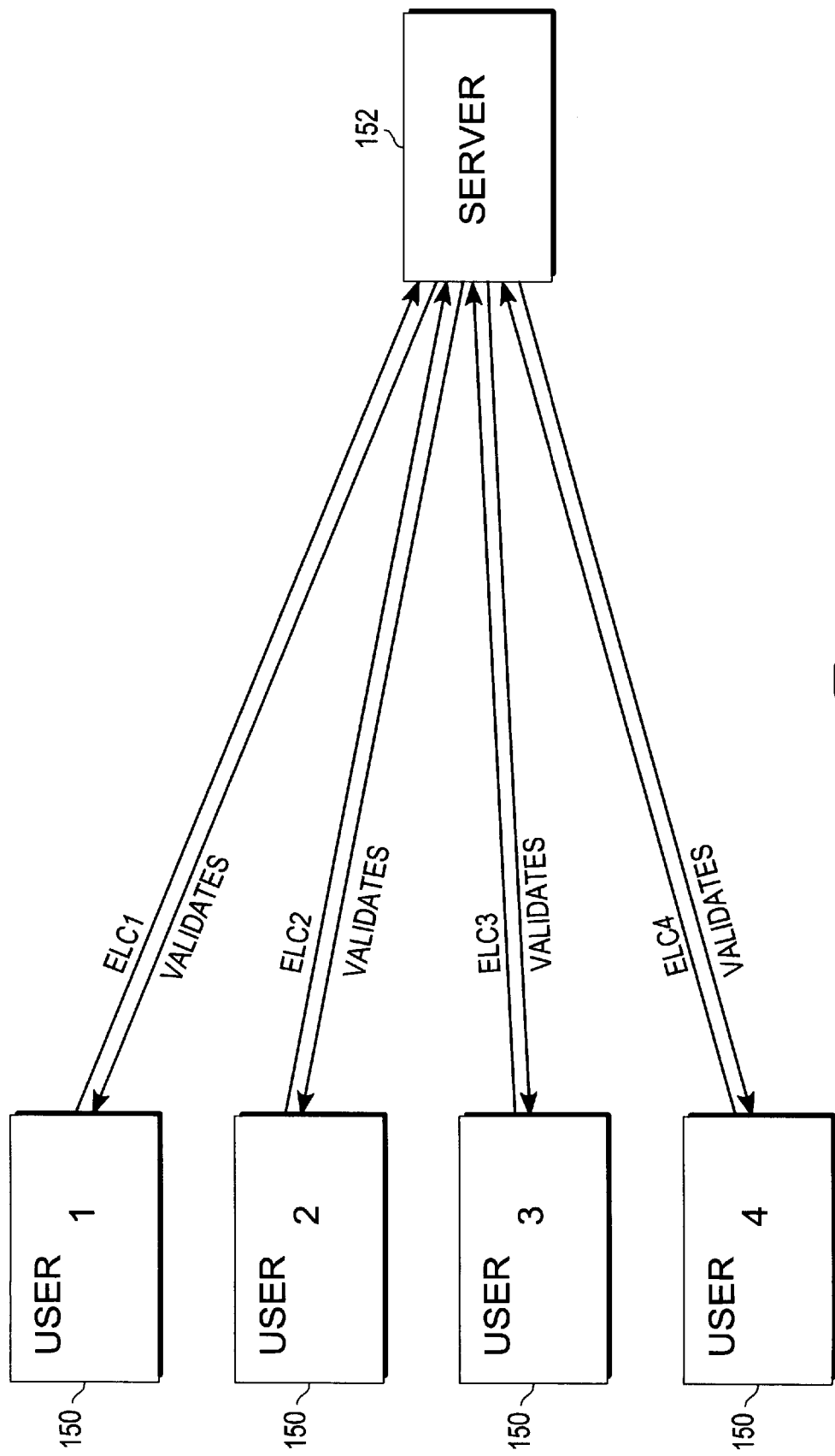
FIG. 4 is a simple block diagram of a system in accordance with the present invention.
Figure 5:
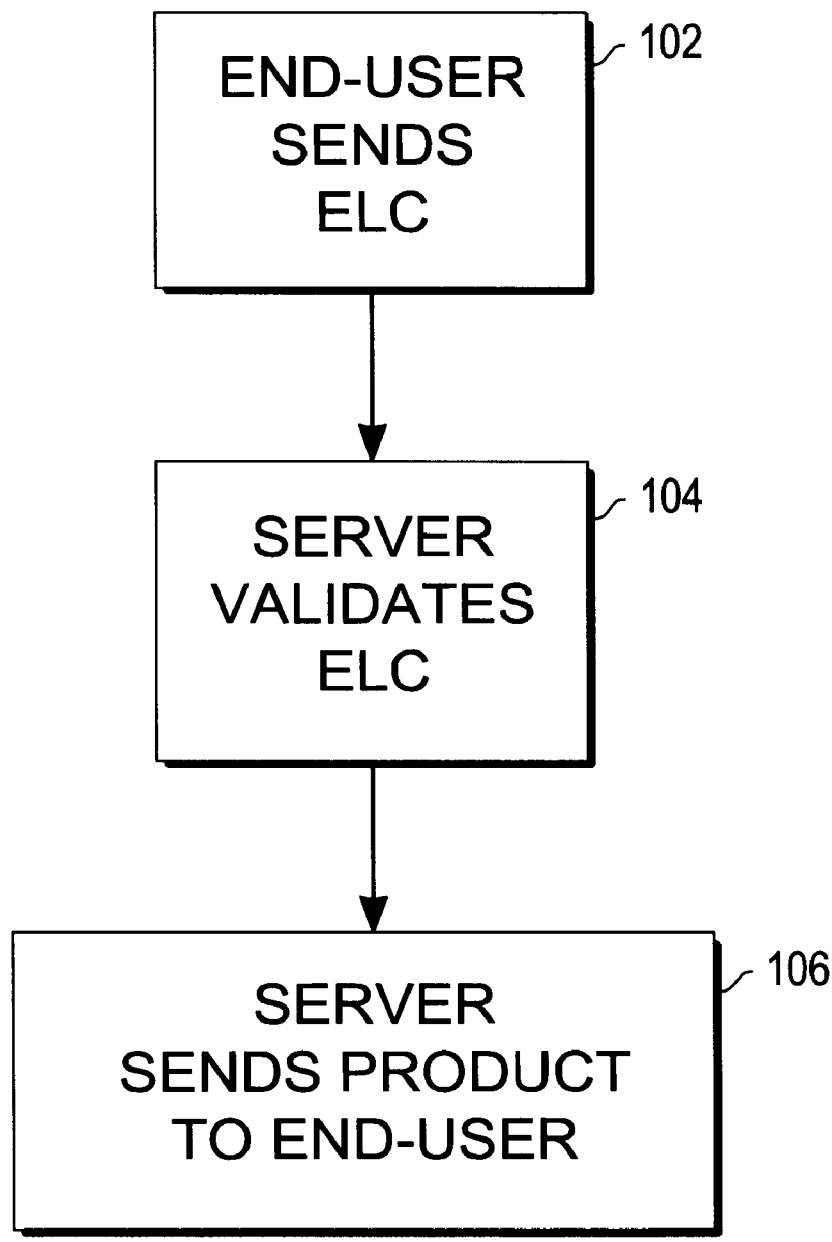
FIG. 5 is a simple flow chart of the steps performed by a software distribution system in response to an authorization request by an end-user in accordance with the present invention.

FIG. 4 is a simple block diagram of a system in accordance with the present invention. FIG. 5 is a simple flow chart of the steps performed by a software distribution system in response to an authorization request by an end-user in accordance with the present invention. Referring now to FIGS. 4 and 5 together, in such a method, a plurality of end-users 150 send in an electronic license certificate (ELC) to a server 152, via step 102. Next, the server 152 validates the ELC, via step 104 and then the server 152 downloads the digital products associated with license, via step 106 to the plurality of end users 150.

The primary difference between the system in accordance with the present invention and conventional systems is that at purchase time the rights would be delivered to the end-user with the bits to follow (in conventional systems it is the other way round). This allows a large simplification of the delivery process and a corresponding increase in reliability (with an associated increase in customer satisfaction and reduced support overhead).

To accomplish this, an active license (AL) is issued when a client application requests a digital product. The client application would provide some basic functions supporting the transaction and giving information to the end-user, while allowing the publisher to customize the digital product.

Figure 6:
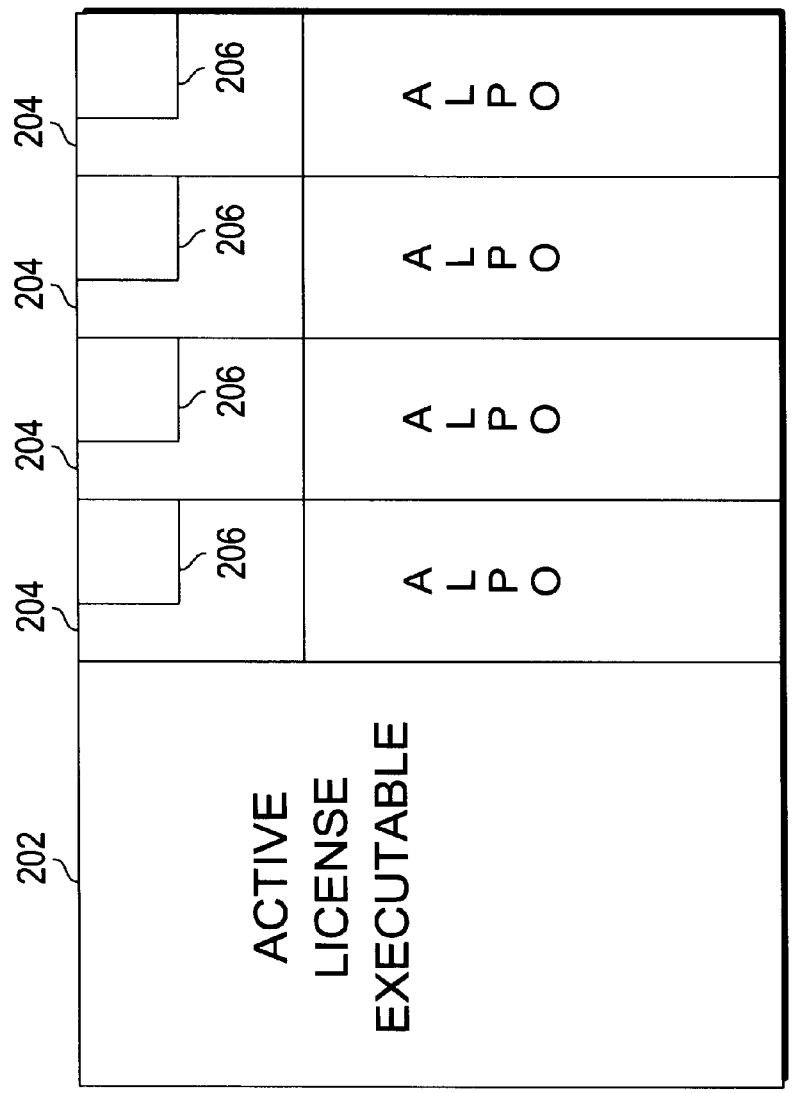
FIG. 6 is a block diagram of an active license.

Referring now to FIG. 6, what is shown is a block diagram for an active license AL 200 in accordance with the present invention. The AL 200 includes a plurality of active license objects (ALPOs) 204, and an executable code 202. There is typically one ALPO 204 for each digital product to be delivered.

Each ALPO 204 may contain a digitally signed certificate document 206 that may entitle the holder to download, install, possess and use a specific product 13 (FIG. 2). In essence, this AL 200 is a software application program that contains three major components: a plurality of ALPOs 204, each of which contains a certificate 206, a certificate viewer, and application functions to perform predetermined operations as granted by the license certificate, for example, retrieving and installing digital products.

Figure 7:
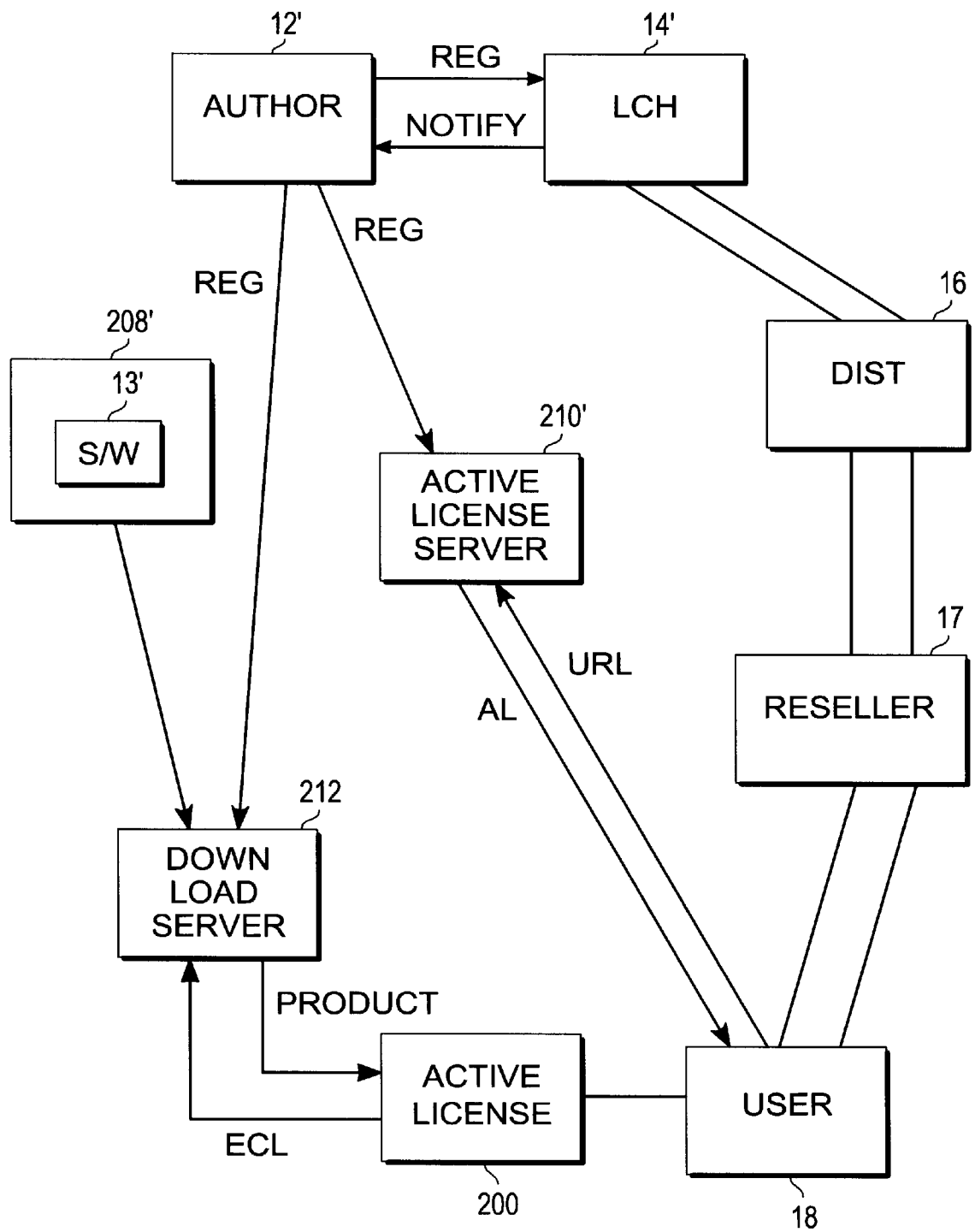
FIG. 7 is a block diagram of a multitiered software delivery method and system in accordance with the present invention.

In a specific example, a transaction processing model in accordance with FIGS. 6 and 7 would include the following steps.

1. End-user 16' completes purchase of a product 13' from, for example, a Web site.

2. A license clearing house (LCH) 14' generates a plurality of licenses for the appropriate products. Accordingly, a single active certificate can contain multiple ELCs 206 and allow an end-user to download multiple products. The ELC 206 will also contain information about the end-user's system, like IP address, that may be used to restrict subsequent distribution of the particular application. This ELC 206 is attached with the appropriate client application, thereby branding the client application with the ELC 206 and known end-user data.

3. An order accept page advises the end-user of the download URL to obtain the AL 200.

4. The end-user follows the download URL. The AL server 210 assembles an AL 200 which contains the executable code 202 and the ALPO 204 that were purchased by the end-user. Once this is assembled the AL 200 is downloaded to the end-user.

5. The end-user executes the AL 200. The end-user will then be walked through the delivery process, which may include, for example, viewing the ELC, accepting the terms of the license, registering their purchase, reading help pages about the download process, and any other sort of functions.

6. The AL 200 communicates by opening a channel (http) to the assigned secure download server 212 at a given URL specified in the ELC 201. The AL 200 will then send a download request message. This message will contain the digitally signed certificate ELC 206, a unique identity key, and any other information related to the ELC 206 and end-user's order.

7. The download server 212 communicates with an LCH 14 server (not shown) to validate the ELC 200. The LCH 14 server upon receiving a message from the end-user will validate the authenticity of the ELC 206 signature, and look up the end-user's order and compare the current session's environment data with the session data from the original order session. Additionally, the system will verify that the order is still valid and that the number of allowed downloads from the requesting client application has not been exceeded. The LCH 14 server will also store the identity data that has been passed from the client application if it has not already been seen. If the identity has been seen before, the LCH 14 server will compare the other identifying information with the information from prior orders to validate that the end-user has not changed identities or possibly stolen the AL 200 from another system.

8. Assuming that no error conditions exist, the appropriate packed BOB 208 will be delivered. This BOB 208 is compressed but not encrypted. (At the discretion of the IP rights publisher, the download connection may be secured via a particular protocol).

9. The BOB 208 is delivered to the end-user. In a preferred embodiment, the AL 200 receives the BOB 208 as a continuous stream. The AL 200 separates the contained files and stores them back into the original directory structure from when the digital product 13' was packed as they are received.

10. Should the BOB 208 download be interrupted, the AL 200 will remember the last completed file, reconnect to the download server 212, and attempt to complete the process. This reconnect and attempt could be performed, a predetermined number of times (at least 5 times) before notifying the end-user of a potential problem.

11. Once the BOB 208 download is complete the AL 200 will initiate the necessary setup program if so directed.

12. The installation of the product is completed and the AL 200 closes. When the AL 200 closes, the end-user is given any specific help or support instructions.

A system and method in accordance with the above embodiment could include, for example, the following features.

The Packed Product

Unlike the earlier digital product delivery methods involving ECLs 206 and unlock key delivery, the AL 200 will function with a compressed, but not encrypted product. In essence, the BOB 208 is packed into a compressed archive that is in turn stored on a secure server. This BOB 208 archive is stored as a single instance on the BOB 208 from server (there will be multiple servers including some inside corporate firewalls). The BOB 208 can only be downloaded by a call from an authorized AL 200 running remotely on an end-user's system.

The Client ALPO Builder

This is a small software tool that permits the IP rights holder, or appropriate agent, with the ability to script and describe unique functions for a AL 200. Through this tool the basic look and feel of the client application screens can be established. This may include background images, labels, help text, etc. Optional pre-defined AL 200 services can be configured and implemented through a set of radio buttons and edit fields. Typical applications would allow a corporation to create a single AL 200 that includes ELCs 206 for the standard set of software installed on a client's PC. This client application would then obtain software from the corporate server which would in turn validate the ELCs 206 with the LCH 14 before releasing software. (For example, BOBs 208 would be encrypted on the corporate server).

The Generic Active License Executable

This is a thin client that contains all of the functions to perform the services defined in the configuration application. It will include screens, call-back functions, and configuration data that was supplied by the ALPOs 204. There will be an open data space for session data, branding information and the actual ELCs 206. This is the base application that is copied, branded, and combined with a LCH ELC 206 to form the AL 200.

ELC

This is a digitally signed certificate that authenticates the product being purchased and identity of the LCH 14'. This ELC 206 will also contain information about the end-user that will be used to brand the AL 200. This ELC 206 will contain a text of the EULA and other information about the IP rights publisher as desired. This will prevent modification of the ELC 206 without requiring that the EULA be transmitted for ELC 206 validation. Optional fields may also be contained to provide session-specific information that is not necessarily related to a specific BOB 208 and was not established during the initial AL 200 configuration. The ELC 206 will, for example, use the CIIT standard X.509 certificate model.

The Session Active License

This is the run-time AL that will be delivered to the end-user upon purchase of a product. At the time an end-user follows a download URL after order acceptance, the AL server 210 application will create the AL 200 by duplicating an instance of the ALPO's 204 for this product. The server 210 will request and acquire an ELC 206 for the product being purchased, place the ELC 206 into the data space provided in the new AL 200, then perform a validation that the Session AL 200 is complete and capable of being executed.

Once built, the AL 200 is served to the end-user. The end-user will execute the AL 200 and follow the appropriate instructions for downloading the product.

Active License

Server Functions

This is a service provided by a server. This service will be capable of creating Als 200 as required. The standard download service will deliver the URL to download the AL 200. This service is actually performed by LCH's 14 merchant servers and is in response to the acceptance of an end-user's purchase transaction. This is the service that will cause the AL 200 to be constructed and will return a download URL where the end-user can retrieve the AL 200. Alternatively a master AL 200 would be issued to a corporation that specifies a set of products to be downloaded.

Accordingly, as is seen, the above-identified system will allow for the user to receive the rights and then the digital product is received. In so doing, the delivery process is simplified with a corresponding increase in reliability.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for delivering a digital product electronically comprising the steps of:

(a) providing an electronic license certificate (ELC) from an end-user to a server, wherein said electronic license certificate may be used to verify that said user is entitled to download said digital product and no other digital product;

(b) validating the ELC by the server;

(c) sending the digital product from the server to the end-user based upon validation of the ELC by the server;

wherein the ELC is provided to said server by providing to said server an active license which comprises executable code and at least one active license object (ALPO), wherein the at least one ALPO includes the ELC;

wherein the executable code generates a license signature which identifies the user; and wherein the at least one ALPO comprises a plurality of ALPOS.

2. The method of claim 1 wherein each of the plurality of ALPOs comprises a digitally signed certificate document.

3. The method of claim 2 wherein the digitally signed certificate document comprises:

a particular ELC; and a certificate viewer.

4. The method of claim 1 in which the ELC will include information relating to the user.

5. The method of claim 1 in which the ELC is transmitted to said end-user before step (a) and only after said end-user has transmitted data indicating acceptance of terms for using said digital product.

6. A method of delivering digital products, the method comprising the steps of:

generating an object specifically configured to participate in delivering a specific digital product over a network, wherein said object includes:

a digital certificate that may be used to verify that a user is entitled to download a set of one or more digital products that include said specific digital product but not said object, and first code that may be executed by a client to cause delivery of a copy of said digital certificate to a server;

causing delivering of said object to said client via said network; and wherein said object includes at least one other digital certificate that may be used to verify that said user is entitled to download and use a set of one or more other digital products that include at least one other digital product but not said object and said specific digital product.

7. The method of claim 6, wherein the method further includes the step of:

said server receiving said copy of said digital certificate from said client in conjunction with a request to deliver said specific digital product to said client;

determining whether said copy of said digital certificate verifies that said user is entitled to download said specific digital product; and causing delivery of said specific digital product when said copy of said digital certificate verifies that said user is entitled to download said specific digital product.

8. The method of claim 7, wherein said specific digital product is configured to run on said client without any participation by said object once said specific digital product is installed on said client.

9. The method of claim 6, wherein said object is generated in response to receiving, from the client on behalf of the user, data that indicates that said user has acquired a right to posses said specific digital product.

10. The method of claim 6, wherein said object includes second code that invokes an user interface for delivery of said specific digital product to said client.

11. The method of claim 6, further including limiting how many times said specific digital product may be downloaded to any client using said digital certificate.

12. The method of claim 7, wherein said specific digital product is delivered to said client in an unencrypted form.

13. The method of claim 12, wherein said specific digital product is delivered to said client in a compressed form.

14. The method of claim 6, wherein said object is configured to participate in the delivery of at least one other digital product.

15. A computer-readable medium carrying an object that includes one or more sequences of instructions for participating in delivery of digital products, wherein said object is specifically configured to participate in the delivery of a specific digital product over a network;

said object includes a digital certificate that may be used to verify that a user is entitled to download a set of one or more digital products that include said specific digital product but not said object;

wherein execution of the one or more sequences of instructions by one or more processors on a client causes the one or more processors to perform steps that include causing delivery of a copy of said digital certificate to a server to verify that said user is entitled to download and use said set of one or more digital products; and wherein said object includes at least one other digital certificate that may be used to verify that said user is entitled to download and use a set of one or more other digital products that include at least one other digital product but not said object and said specific digital product.

16. The computer-readable medium of claim 15, wherein said object further includes instructions for causing said client to interact with said server to deliver said specific digital product to said client via a particular network, wherein the step of causing said client to interact includes the step of delivering said copy.

17. The computer-readable medium of claim 15, wherein said specific digital product is configured to run on said client without any participation by said object once said specific digital product is installed on said client.

18. A computer-readable medium carrying one or more sequences of instructions for delivering a digital product electronically, wherein execution of the one or more sequences of instructions by one or more processors causes the one or more processors to perform the steps of:

(a) providing an electronic license certificate (ELC) from an end-user to a server, wherein said electronic license certificate may be used to verify that said user is entitled to download said digital product and no other digital product;

(b) validating the ELC by the server;

(c) sending the digital product from the server to the end-user based upon validation of the ELC by the server; and wherein the ELC is provided to said server by providing to said server an active license which comprises executable code and at least one active license object (ALPO), wherein the at least one ALPO includes the ELC;

wherein the executable code generates a license signature which identifies the user; and wherein the at least one ALPO comprises a plurality of ALPOS.

19. A computer-readable medium carrying one or more sequences of instructions for delivering digital products, wherein execution of the one or more sequences of instructions by one or more processors causes the one or more processors to perform the steps of:

generating an object specifically configured to participate in delivering a specific digital product over a network, wherein said object includes:

a digital certificate that may be used to verify that a user is entitled to download a set of one or more digital products that include said specific digital product but not said object, and first code that may be executed by a client to cause delivery of a copy of said digital certificate to a server;

causing delivering of said object to said client via said network; and wherein said object includes at least one other digital certificate that may be used to verify that said user is entitled to download and use a set of one or more other digital products that include at least one other digital product but not said object and said specific digital product.

20. The computer-readable medium of claim 18 wherein each of the plurality of ALPOs comprises a digitally signed certificate document.

21. The computer-readable medium of claim 20 wherein the digitally signed certificate document comprises:

a particular ELC; and a certificate viewer.

22. The computer-readable medium of claim 18 in which the ELC will include information relating to the user.

23. The computer-readable medium of claim 18 in which the ELC is transmitted to said end-user before step (a) and only after said end-user has transmitted data indicating acceptance of terms for using said digital product.

24. The computer-readable media of claim 19, wherein the method further includes the step of:

said server receiving said copy of said digital certificate from said client in conjunction with a request to deliver said specific digital product to said client;

determining whether said copy of said digital certificate verifies that said user is entitled to download said specific digital product; and causing delivery of said specific digital product when said copy of said digital certificate verifies that said user is entitled to download said specific digital product.

25. The computer-readable media of claim 24, wherein said specific digital product is configured to run on said client without any participation by said object once said specific digital product is installed on said client.

26. The computer-readable media of claim 19, wherein said object is generated in response to receiving, from the client on behalf of the user, data that indicates that said user has acquired a right to possess said specific digital product.

27. The computer-readable media of claim 19, wherein said object includes second code that invokes an user interface for delivery of said specific digital product to said client.

28. The computer-readable media of claim 19, further including limiting how many times said specific digital product may be downloaded to any client using said digital certificate.

29. The computer-readable media of claim 24, wherein said specific digital product is delivered to said client in an unencerypted form.

30. The computer-readable media of claim 29, wherein said specific digital product is delivered to said client in a compressed form.

31. The computer-readable media of claim 19, wherein said object is configured to participate in the delivery of at least one other digital product.

32. The computer-readable media of claim 15, wherein said computer-readable media further includes instructions for said object invoking a user interface for delivery of said specific digital product to said client.

* * * * *